UNITED STATES PATENT OFFICE 2,396,917

DYE INTERMEDIATES

William Edward Hanford, James Emory Kirby, and David Willcox Woodward, Wilmington, Del., assignors to E. I. du Pont de Nemours & Company, Wilmington, Del., a corporation of Delaware No Drawing. Application September 15, 1942, Serial No. 458,458

12 Claims. (Cl. 260—310)

This invention relates to dye intermediates and more particularly to dye intermediates suitable for use in color photography. The present application is a continuation in part of application Serial No. 301,070, filed October 24, 1939.

This invention has as an object the preparation of dye intermediates useful for the production of dyes applicable to cloth, paper, leather, and the like. Another object is the preparation of dye intermediates suitable for photographic emulsions and capable of being processed by the processes known to the art to produce a colored image. Another object is the preparation of soluble dye intermediates for use in photographic color developing solutions to form insoluble dyes in the photographic emulsion. Another object is the preparation of dye intermediates which are capable of further reaction to form complex dye intermediates which are themselves capable of coupling or condensing to form dyes. Other objects will appear hereinafter.

These objects are accomplished in amides of aliphatic dicarboxylic acids of at least six carbon atoms having attached to one and only one amide nitrogen a color forming nucleus whose free valence stems from carbon and which contains an active methylene group capable of reaction to form an azo or azomethine dye. The term "active methylene" is employed in the sense used by the Patent Office in Subclasses 176 and 193 of Class 260 (Classification Bulletin 74, pages 25 and 26).

The dye intermediates of this invention are acyclic or heterocyclic compounds which contain a prototropic (Whitmore p. 442) methylene (—CH$_2$—) group having its free valences attached, through a chain (—CH=CH—)$_x$ where $x$ is 0 to 3, to carbon or nitrogen, at least quadrivalent in the compound and in turn attached, through a multiple bond, to nitrogen or oxygen.

This configuration is expressed in the following tautomeric formulae—

—CH—(C=C)$_x$—Y=Z ⇌ —C=(C—C)$_x$=Y—ZH

In this Y is carbon or nitrogen, Z is oxygen or nitrogen, and $x$ is 0 to 3. Only the essential components of the structural nuclei are shown. Examples of the specific configuration are as follows:

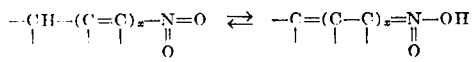

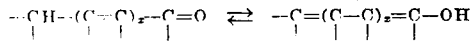

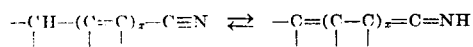

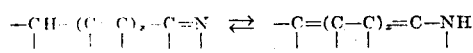

The prototropic methylene group has at least one of its valences attached through a (—CH=CH—)$_x$ group where $x$ is 0 to 3 to a carbonyl group, e. g., the acetoacetanilide of Example III or to an imino group, e. g., the pyrazolone of Example I any remaining valence being satisfied through a (—CH=CH—)$_x$ group where $x$ is 0 to 3, by a carbonyl group, e. g., the acetoacetanilide of Example III, an imino group, e. g., the pyrazolone of Example I, a nitro group, e. g., the nitrophenacylaminophenyladipamic acid of Example IIIa, or a cyano group, e. g., the cyanoacetylamido phenyladipamic acid of Example IIIb.

In these prototropic methylene compounds showing keto enol, nitro-acinitro, methyleneazomethine, etc., tautomerism, the hydrogen in the enol, acinitro, etc., tautomer is replaceable by alkali metal and the methylene group is reactive with aromatic diazonium compounds, aromatic nitroso compounds or the oxidation products of primary amino photographic developing agents of the chromogenic type to form azo or azomethine dyes. Such a methylene group derives its reactivity from having its two free valences attached through a member (—CH=CH—)$_x$ where $x$ is 0 to 3, to an element Y of the fourth and fifth groups and first two periods which form normally gaseous oxides YO$_2$, which element Y has in the compound a valence of at least four and is in turn attached through at least one multiple bond to a polyvalent negative inorganic element, Z, of the first full period.

Particularly important prototropic methylene configurations which may occur in the active methylene (Class. Bull. 74, p. 38) dye intermediates of this invention are the beta diketone, —CO—CH$_2$—CO—; the pyrazolone,

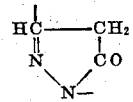

the beta keto amide, —CO—CH$_2$—CO—NH—; the beta keto ester, —CO—CH$_2$—CO—OR; the beta cyanoester, CN—CH$_2$—CO—OR; the malonamide —NHCO—CH$_2$—CO—NH—; etc. See Meyer-Jacobson, Volume 1, part 1, page 418; Karrer (1938) pp. 123-4, 233, 241, 251-2.

These prototropic methylene configurations are characterized by a methylene group between two "negative" groups (Meyer-Jacobson supra). The molecule may also contain halogen, alkyl, alkoxy, aralkyl, nitro, carboxylic, sulfonic, sulfone, aryl, etc., substituents so long as a coupling methylene group is available. These nuclei are hereinafter designated with the symbol Q.

The dye intermediates of the present invention have the formula Q—NH—CO—R—CO—X, wherein Q is a monovalent organic radical having a structure suitable for the production of azo or azomethine dyes as described above, R is an aliphatic, including cycloaliphatic, radical which may be straight or branched chain and may be hydrocarbon or may contain ether-linkages either in the chain or in a substituent on the chain and which contains at least two and preferably four to twenty carbon atoms in the chain, and X is $NH_2$, OH, halogen, or OR' in which R' is the radical R' of an organic hydroxyl compound R'OH esterifiable by acid. That is, CO—X is a carboxyl group or an ester, amide, or halide thereof, and —CO—R—CO— is the diacyl radical of an aliphatic dicarboxylic acid and contains only carbon, hydrogen and oxygen, any oxygen atoms above two being ether oxygen atoms.

The compounds of this invention may be synthesized in various ways. The preferred method is that of the condensation of a monochloride of an aliphatic dicarboxylic acid ester of the type Cl—CO—R—COOR' with an amine $QNH_2$, where Q has the structure as previously described and R and R' are as previously defined. The ester group (COOR') in the condensation product is capable of conversion to any one of a number of other derivatives of the acid, such as to other ester groups, the free acid, amide, or acid halide.

The more detailed practice of the invention is illustrated by the following examples wherein parts given are by weight. There are, of course, many forms of the invention other than the specific embodiment.

*Example I*

One hundred eighty-nine parts of 1-(m-aminophenyl)-3-methyl-5-pyrazolone is dissolved in 1000 parts of pyridine and cooled to 5° C. at which temperature 176 parts of the chloride of monomethyl adipate is added slowly during one hour. The mixture is then stirred at room temperature for one hour and poured into a solution containing 1000 parts of concentrated hydrochloric acid, 500 parts of water, and 1000 parts of ice. This mixture is extracted four times with a total of 1200 parts of ethyl acetate and the aqueous portion discarded. The ethyl acetate solutions are combined, concentrated to 400 parts, extracted twice with 200 parts of 10% sodium carbonate solution, and these extractions combined and washed with 200 parts of ethyl acetate. The carbonate solution is then acidified with hydrochloric acid and extracted three times with a total of 800 parts of ethyl acetate. The ethyl acetate extraction is then washed once with water, dried, and evaporated to an oil. This oil is dissolved in 200 parts of alcohol, boiled with activated charcoal, and filtered. The product separates on cooling as white crystals which, when further purified, melt at 118–120° C. The yield is 37%. The product analyzed 61% carbon, 6.3% hydrogen, and 11.49% nitrogen, the theory being 61.35% hydrogen, and 12.69% nitrogen for methyl N-meta-(3-methyl-5-ketopyrazyl)-phenyl adipamate of the empirical formula $C_{17}H_{21}O_4N_2$, having the structure

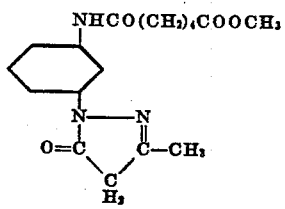

This reactive methylene amide ester may be converted to esters of higher boiling alcohols such as the ethyl, benzyl, stearyl, furyl, etc., by heating with an excess of the higher boiling alcohol and an ester interchange catalyst such as p-toluenesulfonic acid whereby the methyl alcohol may be distilled off and the product crystallized from the solution.

It may be converted to the amide by stirring for twelve hours with an excess of concentrated ammonia solution, to the free acid by heating for half an hour in an excess of 2N sodium hydroxide then acidifying with hydrochloric acid to precipitate the free acid or to the acid halide by stirring the acid with a slight excess of thionyl halide, e. g., thionyl chloride.

*Example II*

A photographic film bearing a latent silver halide image is developed in a p-aminodiethylaniline developer solution containing, in 100 parts of developer solution, 0.5 part of N-meta-(3-methyl-5-ketopyrazyl)phenyladipamic acid prepared by alkaline hydrolysis of the compound of Example I. The film is then washed, and the silver and silver salts removed in Farmer's reducer. The resulting film contains a magenta azomethine dye image of the following probable structure:

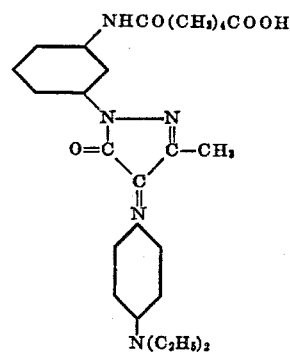

*Example III*

Twenty-seven and six-tenths parts of p-nitroaniline and 10 parts of sodium hydroxide are stirred with 300 parts of ether at 5° C., while 36 parts of the chloride of monomethyl adipate is added during one hour. The mixture is then refluxed for one hour, cooled and filtered. The product is stirred three times with a total of 1000 parts of water and finally dissolved in 500 parts of ethyl acetate. This solution on evaporation deposits in 72% yield bright orange crystals melting at 193–194° C., analyzing 9.7% nitrogen as compared with 10% of the theory for methyl N-p-nitrophenyladipamate of the empirical formula $C_{13}H_{16}O_5N_2$ and structural formula

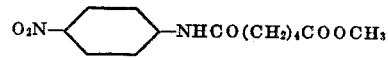

The free acid is obtained by hydrolysis in alkaline sodium hydroxide solution. It is a light orange solid decomposing at 160–167° C. analyzing 10.39% nitrogen as compared with 10.57% of the theory for $C_{12}H_{14}N_5O_2$.

Twenty-six parts of the above N-p-nitrophenyladipamic acid is dissolved in 120 parts of glacial acetic acid at 80° C. and 20 parts of powdered zinc dust is added slowly. After the zinc is dissolved, the mixture is poured into 700 parts of 10% sodium hydroxide solution at 5° C. and filtered. The product is recrystallized from 200 parts of 50% alcohol. Ten parts of this product, N-p-aminophenyladipamic acid, is dissolved in 40 parts of anhydrous monochlorbenzene in a reaction vessel equipped with a mechanical stirrer and distillation column and heated to the boiling point of the solution while 5 parts of ethyl acetoacetate is added. After the alcohol has distilled, the solvent is evaporated to one-half its original volume under reduced pressure and the N-p-acetoacetaminophenyladipamic acid is filtered and dissolved in 200 parts of 5% sodium hydroxide, the solution filtered, the filtrate acidified, filtered, and the solid recrystallized from alcohol. It has the following structure:

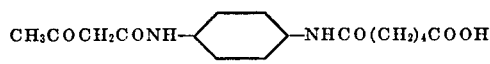

This reactive methylene compound may be esterified by dissolving in an alcohol, e. g., ethanol, cyclohexanol, oleyl alcohol, benzyl alcohol, etc., saturating with dry hydrogen chloride, allowing to stand for five days at room temperature, removing hydrogen chloride and some of the alcohol at reduced pressure. On cooling the ester crystallizes. The ester and the free acid may be converted as in Example I to other esters, the amide, or acid halide.

*Example IIIa*

The N-p-aminophenyladipamic acid may be reacted with p-nitrophenylacetyl chloride to give p(4-nitrophenacyl) aminophenyladipamic acid

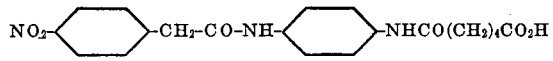

which reacts with diamine or aminohydroxy developers, e. g., p-aminodiethylaniline to give an azomethine dye of the formula

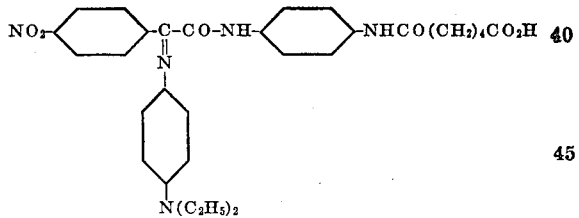

*Example IIIb*

The N-p-aminophenyladipamic acid may be reacted with cyanoacetyl chloride to give p-cyanoacetylaminophenyladipamic acid

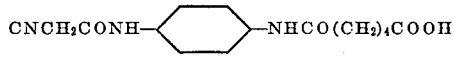

which reacts with a diazonium salt, e. g., p-nitrophenyldiazonium chloride to give an azo dye of the formula

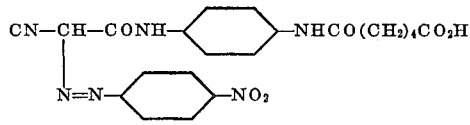

*Example IV*

Thirty-five parts of the acetoacetanilide of Example III is added to 200 parts of boiling water containing 4 parts of sodium hydroxide and 2 parts of sodium carbonate. When the solid is all dissolved, the solution is cooled to room temperature. To this is added a solution prepared by diazotizing 14 parts of p-nitroaniline in 250 parts of 1 molar hydrochloric acid solution at 5° C. with 10 parts of 10 molar sodium nitrite solution. After 15 minutes of agitation, the solution is neutralized with a mineral acid and the yellow dye removed by filtration. This dye has the following probable structure.

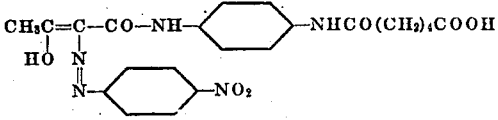

*Example V*

A solution of 23 parts of the hydrochloride of p-aminoacetoacetanilide in 100 parts of pyridine is stirred at 5° C. while 20 parts of the chloride of monomethyl adipate is added. The mixture is then stirred at 30° C. for one hour and poured into 100 parts of ice water containing 200 parts of concentrated hydrochloric acid. The precipitate is removed and recrystallized several times from alcohol to give a white crystalline solid, methyl N-p-acetoacetaminophenyladipamate:

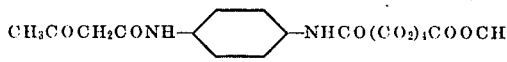

*Example VI*

In a process similar to that of Example II, 0.5 part of N-p-acetoacetaminophenyladipamic acid of Example III is used in place of the pyrazolone derivative. The resulting film contains a yellow dye image. The dye has the following probable structure:

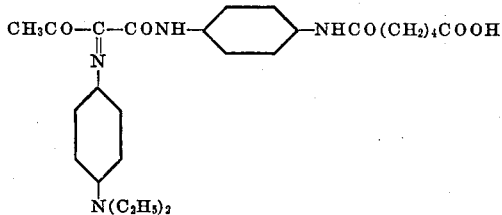

The reactive methylene dye intermediates of the present invention may have a variety of dye forming nuclei attached through the amide linkage to the diacyl radical of an aliphatic dicarboxylic acid. Thus, the m-aminophenylmethylpyrazolone of Example I and the p-aminoacetanilide of Example V may be replaced by aminoacylacetaminoarylmorpholine prepared as in U. S. 2,133,937 using a nitroaminoarylmorpholine which is condensed with ethyl acetoacetate in boiling monochlorobenzene and then reduced with hydrogen and Raney nickel to the aminoacylacetaminoarylmorpholine. The furoylacetamides of U. S. 2,184,303 may likewise be used in place of the acetoacetamide and benzoylacetamides.

Other reactive methylene containing amines which may be reacted with aliphatic dibasic acid monochloride monoesters includes the following:

(a) The Ar amino derivatives of the oxalic (pyruvic) acid esters of the methylene compounds of U. S. Patent 2,186,850. These amino derivatives may be prepared by formation of the oxalic acid esters of the nitrofluorene, nitrobenzofluorene, nitroindene, nitrodiphenylmethane, etc. followed by catalytic reduction using hydrogen and Raney nickel.

(b) The Ar amino derivatives of the phenyl-, benzoxazyl-, benzthiazyl- and quinoxalylpyroracemic acids of U. S. Patent 2,214,483 which Ar amino derivates may be prepared by methods described under (a) above.

(c) The Ar amino derivatives of the active methylene compounds of British Patent 478,934 which amino derivatives are prepared by use of a nitroaromatic compound in the preparation of the products of that invention. The nitro group may be reduced as a last step, either catalytically or with sodium polysulfide.

(d) The amino derivatives prepared from the nitroarylpyrazolones of U. S. Patent 2,265,221 by reduction of the nitro group of the compounds of Examples I and IV by use of hydrogen with Raney nickel.

(e) The amino derivatives prepared from acetacetamino and cyanacetamino compounds of U. S. Patent 2,108,602 by use of a nitroaromatic compound in the preparation of the products of that invention and subsequent reduction of the nitro group to the amino group.

(f) The amino derivatives of the acetoacetyl hydrocarbons of U. S. Patent 2,113,330 prepared by introduction of a nitro group by direct nitration into the aromatic nucleus during preparation of the compounds, which nitro group is subsequently reduced as under (d) above. Or an acetamino aryl compound can be used in forming the products of that invention and the acetyl group hydrolyzed in boiling dilute mineral acid to give the amino compound.

(g) The Ar amino derivatives of the cyanacetyl derivatives of acenaphthene, dibenzofurane, coumarone, diphenyl ether of U. S. Patent 2,115,394 prepared by introduction of a nitro group, using acetyl nitrate and acetic anhydride, into the aromatic nucleus after formation of the cyanocetyl group, said nitro group being reduced by sodium polysulfide.

(h) The Ar amino derivatives of the isoxazolones of British Patent 460,599 prepared by methods described under (c) above.

(i) Aminophenacylpyridinium bromide prepared by condensation of nitrophenacylbromide with pyridine followed by reduction with zinc dust in dilute mineral acid.

(j) Aminonitrobenzyl cyanides prepared by nitration and hydrolysis of acetaminobenzylcyanides.

(k) Aminoindoxyls prepared by acetylation, nitration, reduction and hydrolysis of indoxyl.

(l) Aminothioindoxyls prepared by acetylation, nitration, reduction and hydrolysis of indoxyl.

(m) Aminohomophthalimides prepared by reduction of nitro homophthalimides.

In place of the monomethyl adipic acid monochloride used above there may be employed the half ester acid chloride of any aliphatic dicarboxylic acid having in the diacyl -CO-R-CO- radical only carbon, hydrogen and oxygen with any oxygen atom above two an ether oxygen atom. Thus, there may be employed the monoester monohalides of straight chain acids, including pimelic, suberic, azelaic, sebacic, nonandicarboxylic, etc. acids; branched chain acids including 2-ethylglutaric, $\beta,\beta$-dimethylpimelic, and camphoric acids; cycloaliphatic acids, including cyclobutanedicarboxylic, cyclopentanedicarboxylic, and hexahydrophthalic acids; unsaturated acids including cyclohexenedicarboxylic, 2-ethylitaconic and sedanolic acids; and oxygen containing acids including diglycolic acid, $\beta$-ethoxyglutaric acid, etc.

In place of the specific aromatic amino developing agents described in the preceding examples various other specific agents of this type may be substituted. The agents have an unsubstituted amino group which apparently enables the oxidation products to couple with the color forming compounds. Such agents include the mono-, di-, and tri-aminoaryl and aminohydroxy compounds in which one amino group is in the ortho or para position to another amino group or to an hydroxy group and the compounds formed therefrom by substitution in the amino group, as well as in the ring; thus, halogen, alkyl, alkoxy, and aryl groups may be present.

In place of the specific developing agents described in the above examples, a large number of other color coupling developing agents containing an unsubstituted amino group can be substituted. Suitable additional agents are described in U. S. Patents 2,182,814, 2,189,817, 2,191,037, 2,200,924, 2,163,820, and British Patent 541,649.

In the preparation of the compounds of this invention the nucleus Q of the amine QNH₂ used in the previously described condensations with the monoester monohalide of the aliphatic dicarboxylic acid may be obtained from a non-coupling radical, i. e., one not having an active methylene group which is capable of conversion through simple reactions to a coupling nucleus. For instance, the compound may contain a nitro group (—NO₂) as in Example III which is reduced to an amino group and condensed with a beta-keto ester to form an active methylene compound. Alternatively, this amine reduction product of the nitro compound can be diazotized, reduced to the hydrazine, and condensed with a beta-keto ester to form a pyrazolone.

Thus p-aminoazobenzene can be reacted with monomethyl adipyl monochloride, then reduced with sodium polysulfide to give N-p-aminophenyladipamic acid which may be condensed with a beta-keto ester, e. g., acetoacetic ester, to give the N-p-acetoacetaminophenyladipamic acid of Example III.

The dye-forming nucleus Q may contain such solubilizing groups as the carboxyl (—COOH) or sulfonic (—SO₃H), but lacking these sulfonic acid groups may be introduced into the dye-forming nucleus as the final moncamide coupling component by heating with concentrated sulfuric acid. Thus this invention is of wide application making it possible to prepare any coupling component of the above general formula and containing a wide selection of substituents.

In the preferred process phase wherein an aliphatic dicarboxylic acid monoester monohalide is reacted with an aromatic compound having an amino group available for amide formation, the reaction is carried out at a temperature of 0°–100° C. and at atmospheric pressure, molecular equivalents of reactions being used.

The condensation of the aromatic amine with the ester chloride of the aliphatic dicarboxylic acid to form the amides of the present invention is conveniently effected in a liquid medium. A number of media are available for effecting the condensation of the aromatic amine and the ester chloride of a dibasic acid, and the proper medium for the particular reaction is determined by a consideration of the reactivity and solubility of the reactants and ease of isolation of the product. The condensation is preferably carried out in inert solvents, i. e., liquid hydrocarbons, chlorinated hydrocarbons, and ethers, or in water in the presence of solids or liquids capable of removing hydrogen chloride from the reaction. Such agents include the alkali and alkaline earth hydroxides, carbonates, phosphates, oxides, etc., or their aqueous solutions and tertiary amines, i. e., pyridines, quinoline, triethylamine, dialkyl anilines and N,N,N',N'-tetramethylethylenediamine or a similarly constituted compound.

The compounds of the present invention are very useful in photographic processes and in the preparation of polyamide coupling components of the type described in copending application Serial No. 301,041 filed October 24, 1939. The alkali-soluble lower members of this class, i. e., those containing a free carboxyl or sulfo group, and not more than ten carbon atoms, are valuable components in color-development solutions as, while they are alkali-soluble, the dyes that may be produced from them during development are only sparingly soluble and are not readily removed from the films. Further, members of this new class of coupling components containing alkyl chains of at least four carbon atoms may be converted to valuable azo dyes which are especially suited for dyeing such fibers as wool in good shades which are fast to washing and fulling. Alternatively, water-insoluble dyes may be prepared which are advantageously used in the preparation of azo pigments and rubber colors. Many of the dyes produced in this manner impart a waterproof effect to textiles.

The above description and examples are intended to be illustrative only. Any modification of or variation therefrom which conforms to the spirit of the invention is intended to be included within the scope of the claims.

What is claimed is:

1. A monomeric amide of the formula

Q—NH—CO—R—CO—OH wherein Q is a pyrazolone nucleus attached through carbon to the —NH— and R is a polymethylene radical of at least four carbon atoms.

2. A monomeric amide of the formula

R'—CO—CH₂—CONH—Ar—NHCO—R—CO—OH wherein R' is a monovalent hydrocarbon radical, Ar is a bivalent aromatic radical and R is a polymethylene radical of at least four carbon atoms.

3. A monomeric amide of the formula

CH₃COCH₂CONHC₆H₄NHCO—(CH₂)ₓ—COOH wherein x is at least four.

4. p-Acetoacetamidophenyladipamic acid.

5. m,1-(3'-methyl - 5'-ketopyrazyl)phenyladipamic acid

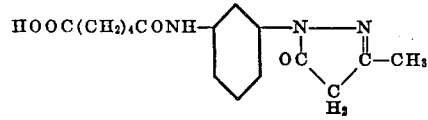

6. A monomeric acylacetamidophenyladipamic acid.

7. A monomeric amide of a monomeric aliphatic dicarboxylic acid of at least six carbon atoms having attached to one and only one amide nitrogen a color forming nucleus which contains an active methylene group capable of reaction to form a dye, said nucleus being joined to said amide nitrogen by a valence attached to a carbon of said nucleus.

8. A monomeric amide of a monomeric aliphatic dicarboxylic acid of at least six carbon atoms having, attached to one and only one amide nitrogen, a color forming nucleus, which nucleus is bonded to the amide nitrogen from a carbon of said nucleus and contains an active methylene group capable of reaction to form a dye and having each of the two valences not attached to hydrogen attached to an element Y of the fourth and fifth groups of the periodic system and of the first full period thereof, which element Y in the dicarboxylic acid amide has a valence of at least four and is in turn attached through at least one multiple bond to a polyvalent negative inorganic element of the first full period of said system.

9. A monomeric amide of a monomeric aliphatic dicarboxylic acid of at least six carbon atoms having, attached to one and only one amide nitrogen, a color forming nucleus which is bonded to the amide nitrogen from a carbon of said nucleus and which contains an active methylene group capable of reaction to form a dye and having one of the valences not attached to hydrogen directly attached to a group of the class consisting of carbonyl and imino groups and the remaining valence directly attached to a group from the class consisting of the carbonyl, imino, cyano and nitro groups.

10. A monomeric amide of the formula

Q—NH—CO—R—CO—X wherein X is a radical of the class consisting of the amido, halide, hydroxyl, and esterified hydroxyl radicals, —CO—R—CO— is the diacyl radical of a monomeric aliphatic dicarboxylic acid of at least six carbon atoms containing only carbon, hydrogen and oxygen, in which diacyl radical any oxygen above two is ether oxygen and Q is a monovalent radical attached to the NH by a valence attached to carbon of said monovalent radical, which radical contains an active methylene group capable of reaction to form a dye.

11. A monomeric amide of a monomeric aliphatic dicarboxylic acid of at least six carbons having a pyrazolone nucleus attached through carbon to one and only one amide nitrogen.

12. p-Cyanoacetylaminophenyladipamic acid.

WILLIAM EDWARD HANFORD.
JAMES EMORY KIRBY.
DAVID WILLCOX WOODWARD.